(No Model.)
J. T. KILLMEIER.
FISH HOOK.
No. 590,705. Patented Sept. 28, 1897.
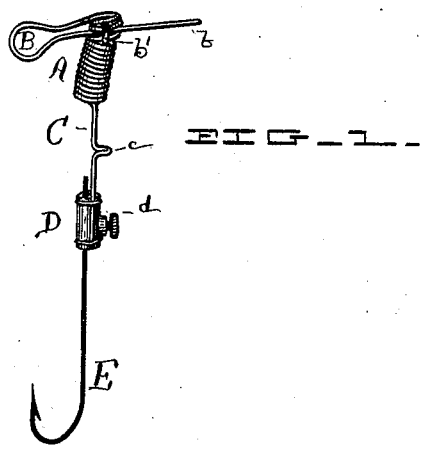
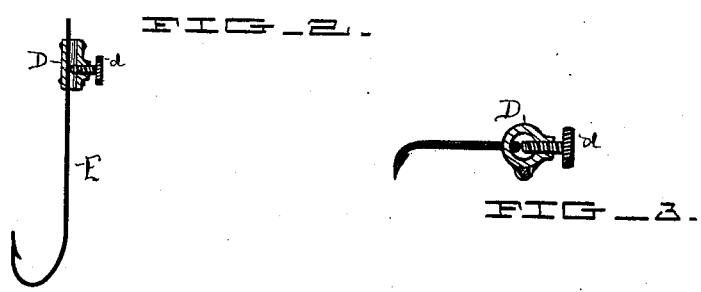
Witnesses
H. D. Nealy
M. L. Gordon
Inventor
Joseph T. Killmeier
By Attorney J. H. Gibbs

UNITED STATES PATENT OFFICE.

JOSEPH THEO. KILLMEIER, OF LOUISVILLE, KENTUCKY.

FISH-HOOK.

SPECIFICATION forming part of Letters Patent No. 590,705, dated September 28, 1897.

Application filed April 4, 1896. Serial No. 586,178. (No model.)

*To all whom it may concern:*

Be it known that I, JOSEPH THEO. KILLMEIER, of the city of Louisville, in the county of Jefferson and State of Kentucky, have invented certain new and useful Improvements in Fish-Hooks and Holders Therefor, of which the following, taken in connection with the accompanying drawings, is a full, clear, and exact description.

This invention relates to new and useful improvements in fishermen's devices for carrying the fish-hook; and it consists in certain new and useful details of construction and operation of parts, all as hereinafter more fully set forth in the specification and specifically pointed out in the claims.

In the annexed drawings similar letters of reference denote corresponding parts in all views, in which—

Figure 1 is an elevation or side view of the device with a fish-hook in place. Fig. 2 is a sectional view of the lower end or retaining-collar D with its retaining set-screw $d$, and Fig. 3 is a cross-section of Fig. 2.

The object of the invention is to provide a convenient carrier for a fish-hook which will unite the feature of spring-hook and retaining device, and to that end I use a single piece of spring-wire, at the lower end of which is secured a retaining-collar D, provided with a set-screw $d$ to hold within said collar any fish-hook which may be projected into the same.

At the opposite end is a coiled-spring barrel A, from which extends a loop B, made integral therewith, and from said loop projects a stem $b$. At a convenient distance above the collar D is formed a hooked portion $c$ in the stem C, the hooked portion consisting of a bend in said stem. Looped around the strands at the upper portion of the coiled barrel A is a wire loop $b'$, which acts in the double capacity of a retaining-loop to hold the stem $b$ in position between the coils of said barrel A and to serve as a tension-loop, so that as said loop is drawn toward the loop B the strain will increase and as the said loop $b'$ is drawn toward the free end of the stem $b$ the tension will lessen.

The foregoing description is of the article as constructed, but in operation the stem $b$ and hooked portion $c$ of the stem C perform an important function, as the said stem $b$ is caused to interlock with said hooked portion when in use, thereby bending the barrel A in the arc of a circle from left to right, the circle being held by means of the interlocking of the point $b$ with said hook $c$.

In use the last-described position is the one assumed by the device with the bait secured on the hook E.

The device in practice acts as a "sinker," though not sufficiently heavy to interfere with free movement of any live bait attached to the hook E.

The device being set in the last-above-described position, it will be apparent that a slight pull on the bait attached to the hook E will disengage the point $b$ from the hook $c$, whereupon the device will be caused to spring quickly into its normal position, being carried with great rapidity in the direction indicated by the arrow, thereby fastening the hook E into the jaws of the fish disturbing the bait automatically and avoiding the loss of a good catch, which frequently results in ordinary fishing.

In practice the line may be secured to the loop B or to the loop ordinarily common to the hook (not shown in the drawings) and run from thence through the loop B.

The collar D may be secured in any suitable and convenient manner to the wire C, and any equivalent of the set-screw $d$ may be used to secure the hook in place.

The tension-loop $b'$ may be dispensed with if it is found desirable, in which case the projection $b$ should be run into the coil composing the barrel A, at the open upper end thereof, and be brought out at the side between two strands of the wire of said coil.

It will be apparent that the collar D may be dispensed with and the hook E be formed of a continuation of the stem C, the whole being formed of a single piece of wire, if desired, though I prefer the style shown, as it thereby permits using different hooks with the one general holder.

Having described my invention, what I claim is—

1. As a new article of manufacture, a fish-hook holder consisting of a single piece of wire with a coiled body portion A, a hangerloop B, a hooked portion c and an engaging collar D adapted to hold a fish-hook as E, all substantially as specified and shown.

2. As a new article of manufacture a fish-hook holder comprising a coiled barrel portion A, a loop B with projecting stem b, a stem C with a hooked portion c and a holding-collar D with set-screw d, all constructed substantially as specified.

3. As a new article of manufacture, a fish-hook holder comprising a coiled barrel portion A, a loop B with stem b, a stem C with hooked portion c and a hook extending therefrom, all substantially as specified.

4. As a new article of manufacture, a fish-hook holder, comprising the barrel portion A, loop B with stem b tension-loop b' and stem C with hooked portion c, all substantially as specified.

In testimony whereof I have hereunto signed my name, in the presence of two attesting witnesses, at Louisville, in the county of Jefferson, in the State of Kentucky, this 17th day of March, 1896.

JOSEPH THEO. KILLMEIER.

Witnesses:
FREDERICK H. GIBBS,
JOSEPH MARTINKO.